(12) United States Patent
Silva Filho et al.

(10) Patent No.: US 9,749,426 B2
(45) Date of Patent: Aug. 29, 2017

(54) METHOD, SYSTEM, AND APPARATUS FOR AGENT-BASED ARCHITECTURE FOR INTEGRATED MOBILE APPLICATIONS

(71) Applicant: General Electric Company, Schenectady, NY (US)

(72) Inventors: Roberto Silveira Silva Filho, Dublin, CA (US); Anuj Tewari, Walnut Creek, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/447,370

(22) Filed: Jul. 30, 2014

(65) Prior Publication Data

US 2016/0036942 A1    Feb. 4, 2016

(51) Int. Cl.
    *C25D 5/34*     (2006.01)
    *H04L 29/08*    (2006.01)
    *G06F 17/30*    (2006.01)
    *G06T 19/00*    (2011.01)
    *H04W 4/00*     (2009.01)
    *H04W 4/20*     (2009.01)

(52) U.S. Cl.
    CPC ........ *H04L 67/16* (2013.01); *G06F 17/30902* (2013.01); *G06T 19/006* (2013.01); *H04L 67/2847* (2013.01); *H04L 67/2857* (2013.01); *H04L 67/2861* (2013.01); *H04W 4/008* (2013.01); *H04W 4/206* (2013.01)

(58) Field of Classification Search
    CPC .......... G06F 17/30902; G06T 19/006; H04W 4/008; H04W 4/206
    USPC .................. 715/234; 205/208, 238; 709/203; 345/633
    See application file for complete search history.

(56) References Cited

U.S. PATENT DOCUMENTS 8,245,128 B1* 8/2012 Ahad ................ G06F 17/30902
                                                  205/208
2014/0285519 A1* 9/2014 Uusitalo ............... G06T 19/006
                                                  345/633

* cited by examiner

*Primary Examiner* — Kyung H Shin
(74) *Attorney, Agent, or Firm* — Schwegman Lundberg & Woessner, P.A.

(57) ABSTRACT

Example embodiments of a method, system, and apparatus for agent-based architecture for integrated mobile applications are generally described herein. In an example embodiment, a mobile device includes a client agent module. The client agent module may be configured to receive a request from an integrated mobile application. The client agent module may be configured to determine a communication mode including at least a connected mode, a disconnected mode, and an opportunistic synchronization mode. In the disconnected mode, the client agent module may be configured to satisfy the request using local data, if the request can be satisfied with local data; otherwise the client module may be configured to store the request in local data. In the opportunistic synchronization mode, the client agent module may be configured to select data from the local data associated with the request and send the selected data and the request to the server agent.

22 Claims, 12 Drawing Sheets

US 9,749,426 B2

METHOD, SYSTEM, AND APPARATUS FOR AGENT-BASED ARCHITECTURE FOR INTEGRATED MOBILE APPLICATIONS

TECHNICAL FIELD

The subject matter disclosed herein relates to integrated mobile applications and, more particularly, to integrated mobile applications where the communication bandwidth and/or connectivity between the integrated mobile application and the back-end application may be limited.

BACKGROUND

Mobile applications may be used on mobile devices. Users may rely on mobile applications for performing tasks. The mobile applications may be integrated with back-end applications. However, the communication bandwidth and/or connectivity between the back-end applications and the mobile device may be limited. The user of the mobile device may need the mobile applications to perform tasks despite the limited communication bandwidth and/or connectivity between the mobile device and back-end applications.

Thus there are general needs for methods and apparatuses that reduce signaling, bandwidth, and delay associated with communicating between an integrated mobile application and a back-end application.

BRIEF DESCRIPTION

Some or all of the above needs and/or problems may be addressed by one or more example embodiments. In an example embodiment, a mobile device includes a client agent. The mobile device may include a transceiver configured to provide communications between the client agent module of the mobile device and a server agent. The client agent module may be implemented by one or more processors. The client agent module may be configured to receive a request from an integrated mobile application. The client agent module may be configured to determine a communication mode including at least a connected mode, a disconnected mode, and an opportunistic synchronization mode. In the disconnected mode, the client agent module may be configured to satisfy the request using local data, if the request can be satisfied with local data; otherwise, the client module may be configured to store the request in local data. In the connected mode, the client agent module may be configured to forward the request to the server agent. In the opportunistic synchronization mode, the client agent module may be configured to select data from the local data associated with the request and send the selected data and the request to the server agent.

In an example embodiment, a method for a client agent on a mobile device is disclosed. The method may include receiving a request from an integrated mobile application. The method may include determining a communication mode including at least a connected mode, a disconnected mode, and an opportunistic synchronization mode in which more connectivity is available than in the disconnected mode and less connectivity is available than in the connected mode. The method may include satisfying the request using local data if the communication mode is in the disconnected mode. The method may include storing the request in local data if the request cannot be satisfied with local data. The method may include forwarding the request to the server agent, if the communication mode is in the connected mode. The method may include selecting data from the local data associated with the request and sending the selected data and the request to the server agent, if the communication mode is in the opportunistic synchronization mode.

DETAILED DESCRIPTION

The following description and the drawings sufficiently illustrate specific example embodiments to enable those skilled in the art to practice them. Other example embodiments may incorporate structural, logical, electrical, process, and other changes. Portions and features of some example embodiments may be included in, or substituted for, those of other example embodiments. Sample embodiments set forth in the claims encompass all available equivalents of those claims.

Figure 1:
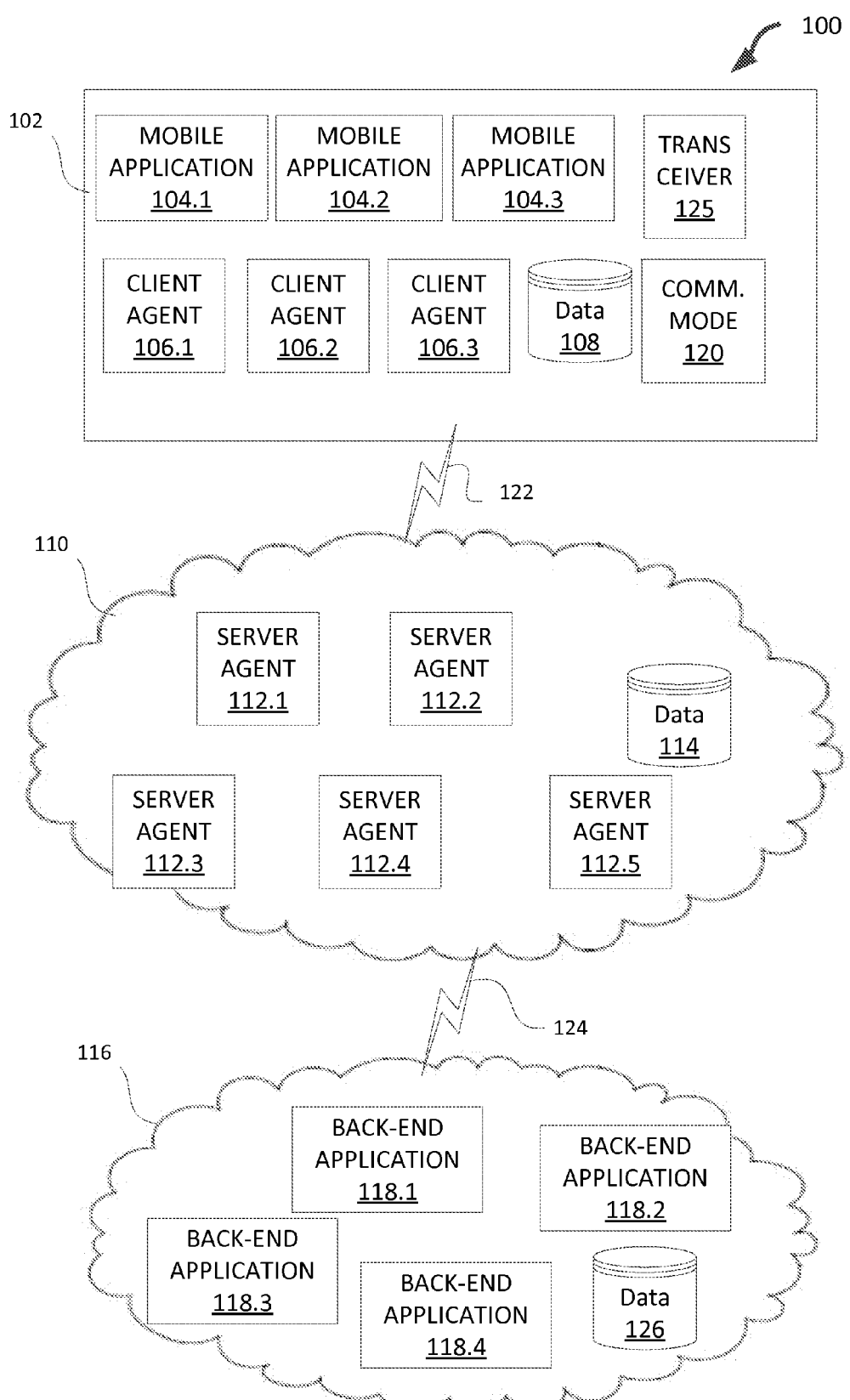
FIG. 1 illustrates a system for integrated mobile applications, according to some example embodiments.

FIG. 1 illustrates a system 100 for agent-based architecture for integrated mobile applications, according to some example embodiments. Illustrated in FIG. 1 are a mobile device 102, mobile applications 104.1, 104.2, 104.3, client agents 106.1, 106.2, 106.3, data 108, communication mode 120, transceiver 125, communication link 122, a communications network 110, server agents 112, data 114, communication link 124, data 126, back-end applications 118.1, 118.2, 118.3, and a second communications network 116.

The mobile device 102 may be a mobile device. Example embodiments of the mobile device 102 include a hand-held computer, laptop, tablet, mobile telephone, computer eyeglasses, and computer wristwatch.

Figure 12:
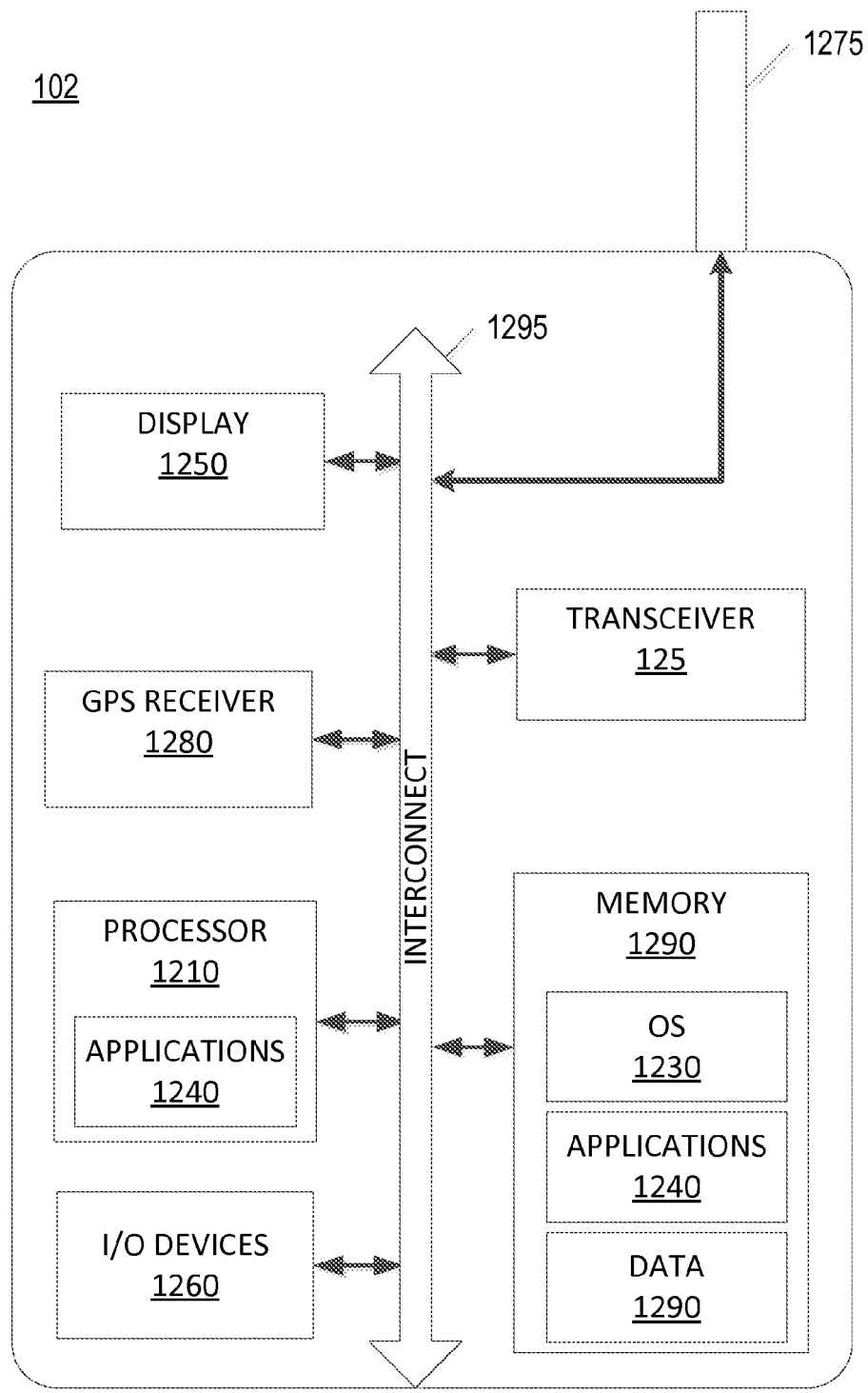
FIG. 12 is a block diagram illustrating the mobile device, according to an example embodiment.

The mobile device 102 may include a transceiver 125 that interfaces with an antenna (see FIG. 12). The transceiver 125 may be configured to both transmit and receive cellular network signals, wireless data signals, or other types of signals via the antenna.

The mobile device 102 may include a communication mode 120 that indicates the communication mode between the mobile device 102 and server agents 112.1, 112.2, 112.3, 112.4, 112.5. In an example embodiment, referring to FIG. 2, communication modes 120 include connected 202, disconnected 204, and connected opportunist synchronization 206. Connected opportunist synchronization 206 may provide more connectivity than disconnected 204 and less connectivity than connected 202.

The communication mode 120 may be determined based on a connectivity and/or bandwidth of the communications between the client agent 106, server agent 112, and/or the back-end application 118. The communication mode 120 may be determined based on the communications link 122, communications network 110, communication link 124, and/or the second communication network 116. In some embodiments, the communication mode 120 may be determined based on an availability of a server agent 112 and/or back-end application 118. For example, a back-end application 118 may not be available due to an outage of a server hosting the back-end application 118 or the back-end application 118 experiencing heavy use. In an example embodiment, the client agent 106 may determine the communication mode 120. In an example embodiment, the client agent 106 may determine the communication mode 120 by determining which communication mode 120 the mobile device 102 is in.

The mobile applications 104 are mobile applications 104 that are running on the mobile device 102. Example embodiments of the mobile applications 104 include a time keeping application, email, activity feed application, accounting application, task management application, and document management application. The mobile applications 104 may access back-end application 118 using the client agents 106. The mobile applications 104 may be implemented with one or more modules.

The client agents 106 are agents that may provide an application program interface (API) for the mobile applications 104. The client agents 106 may be implemented as client agent modules. In example embodiments, the client agents 106 are modules. In example embodiments, the client agents 106 are configured to access data 108 and server agents 112 using communication link 122. In example embodiments, the client agents 106 are configured to respond to calls or requests from mobile applications 104 based on the communication mode 120. In some embodiments, the client agents 106 are configured to synchronize data stored in data 108 with server agents 112 and back-end applications 118. In some example embodiments, the client agents 106 may be configured to pre-fetch data 108. In some example embodiments, the server agents 112 are implemented as representational state transfer (REST)ful Web services. The client agents 106 may be implemented by one or more modules.

The data 108 may be data that is accessed by the server agents 112. Example data 108 include data that is pre-fetched from data 114 and/or data 126. The data 108 may include stored mobile application 104 requests that were not forwarded to the server agent 112. In some embodiments, the data 108 may be a JavaScript Object Notation (JSON) object.

The server agents 112 are agents configured to communicate with the client agents 106 using communication link 122 and with back-end applications 118 using communications link 124. The server agents 112 may be implemented as server agent modules. In some example embodiments, the server agents 112 are modules. In an example embodiment, the server agents 112 are configured to access data 114. In an example embodiment, the server agents 112 are configured to update one or more back-end applications 118 based on being forwarded a request from a client agent 106. For example, server agent 112.1 may update back-end application 118.1 and back-end application 118.3 by using server agent 112.3 and server agent 112.4, respectively. The server agent 112.1 may update more than one back-end application 118 based on a single request from the client agent 106. The server agents 112 may cache data in data 114 from back-end applications 118 and data 126 for servicing requests from client agent 106. The server agents 112 may send data 114 to client agent 106 and/or data 108 based on the communications mode 120.

In an example embodiment, a server agent 112 may provide a service different from a service provided by back-end application 118. For example, server agent 112.2 may provide a document service to client agent 106.2 for a mobile application 104. The document service may access multiple back-end applications 118 to retrieve documents to provide a transparency, which may be in the form of an application program interface, to the mobile application 104 regarding how to retrieve documents from the back-end applications 118. In an example embodiment, the server agents 112 may integrate, summarize, and filter data from the back-end applications 118, data 126, client agents 106, and data 108. In an example embodiment, there is a server agent 112 for each of the client agents 106. In an example embodiment, server agents 112 may store requests from client agents 106 in data 114 and/or data 126 and generate a report of the requests. For example, an activity log client agent 106 may store requests that are activity log reports in data 114 during a work day and then generate a report at the end of the work day.

In an example embodiment, the server agents 112 are implemented as RESTful Web services. In an example embodiment, the system 100 may have the advantage of reducing security attacks on the enterprise services by providing an additional layer of security from the server agents 112. In an example embodiment, the server agents 112 may require previous authentication of client agents 106. The server agents 112 may be implemented with one or more modules.

The data 126 may be data that is accessed by one or more of the back-end applications 126. Example data includes documents, a database of time entries, and a database of scheduling activities.

Some examples of back-end applications 118 include a time keeping application, task management application, and document management application. In an example embodiment, the back-end applications 118 provide points of access to existing applications and services. In an example embodiment, the back-end applications 118 provide raw data 126 by read and/or write requests to data 126. In some example embodiments, the back-end applications 118 may include adapters (not illustrated) to existing back-end applications 118 that provide an API to the back-end applications 118. In some example embodiments, the back-end applications 118 are implemented as RESTful Web services.

The data 126 may be data that is accessed by one or more of the back-end applications 126. Example data includes documents, a database of time entries, and a database of scheduling activities.

The communications network 110 indicates that the server agent 112 and data 114 reside outside the mobile device 102 and may be accessible via one or more communication links such as communication link 122.

The second communications network 116 indicates that the back-end applications 118 and data 126 reside outside the mobile device 102 and may be accessible via one or more communications links such as communication link 124. In some example embodiments, the communications network 110 and communications network 116 may reside in the same communications network. For example, in some example embodiments, the server agents 112 and data 114 may reside on the same corporate network as the back-end applications 118.

In some example embodiments, the client agent 106, server agent 112, and/or back-end applications 118 are configured to populate the data 108 with data from data 126 that may be used by one or more of mobile applications 104.

In some example embodiments, the system 100 is a three tier system with the mobile device 102 being in a first tier; server agent 112 and data 114 in the communications network 110 being in a second tier; and, back-end application 118 and data 126 in the second communications network 116 being in a third tier.

Figure 2:
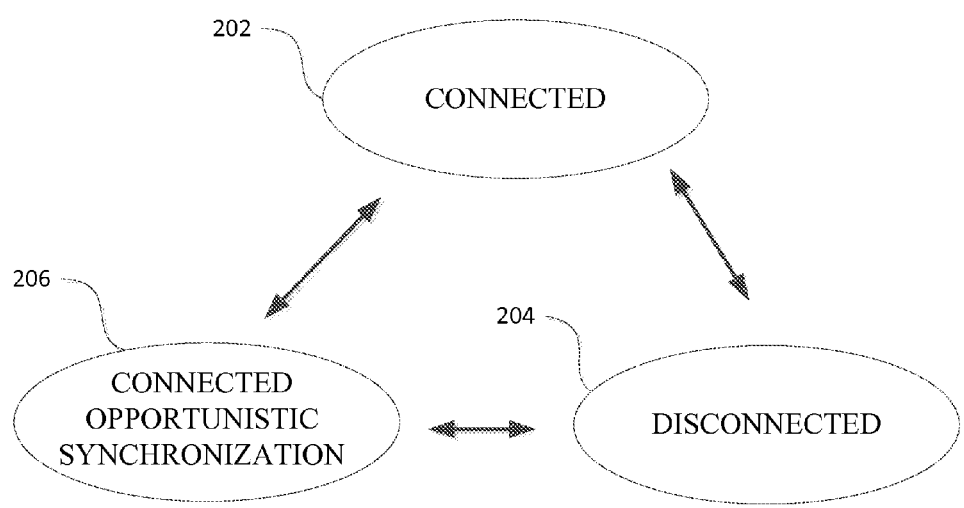
FIG. 2 illustrates different communication modes for the system of FIG. 1, according to some example embodiments.

FIG. 2 illustrates different communication modes 120 for the system of FIG. 1, according to some example embodiments. The communication modes 120 include connected 202, disconnected 204, and connected opportunist synchronization 206. Referring to FIGS. 1 and 2, the connected 202 mode may indicate, based on the communication bandwidth provided by the communication link 122 between the client agents 106 and the server agents 112, that the client agents 106 may pre-fetch data 108 requested by the mobile applications 104. The connected 202 mode may indicate, based on the communications bandwidth provided by the communication link 122, that the client agents 106 and server agents 112 may synchronize data 108 with data 114 and data 126, and that the client agents 106 may forward service requests from the mobile applications 104 to the server agents 112. The client agents 106 may be configured to pre-fetch data 108 when the communications mode 120 is connected 202. The client agents 106 may base what data to pre-fetch from data 114 and data 126 on anticipated data that a user of the mobile device 102 may need to access while in disconnected 204 mode and/or connected opportunistic synchronization 206.

The disconnected mode 204 may indicate, based on the communication bandwidth provided by the communication link 122 between the client agents 106 and server agents 112, that the client agent 106 and server agent 112 do not do one or more of the following: pre-fetch data 108, synchronize data 108 with data 114 and data 126, or service requests from the mobile applications 104. In disconnected mode 204, the client agents 106 may service requests from the mobile applications 104 without forwarding the service requests to the server agents 112. In disconnected mode 204, the client agents 106 may store requests from the mobile applications 104 that cannot be serviced or forwarded to the server agents 112. The stored requests from the mobile application 104 may be forwarded to the server agents 112 when the communications mode 120 is not in disconnected mode 204.

The connected opportunistic synchronization 206 may indicate, based on the communication bandwidth provided by the communications link 122 between the client agents 106 and the server agents 112, that the client agents 106 and server agents 112 use opportunistic synchronization 206 to synchronize data 108 with data 114 and data 126. In connected opportunistic synchronization 206, at least some requests from the mobile applications 104 may be serviced by both the client agents 106 and the server agents 112.

In some example embodiments, the communication mode 120 may be determined based on the communications bandwidth provided by the communication link 122 and the communication link 124.

Figure 3:
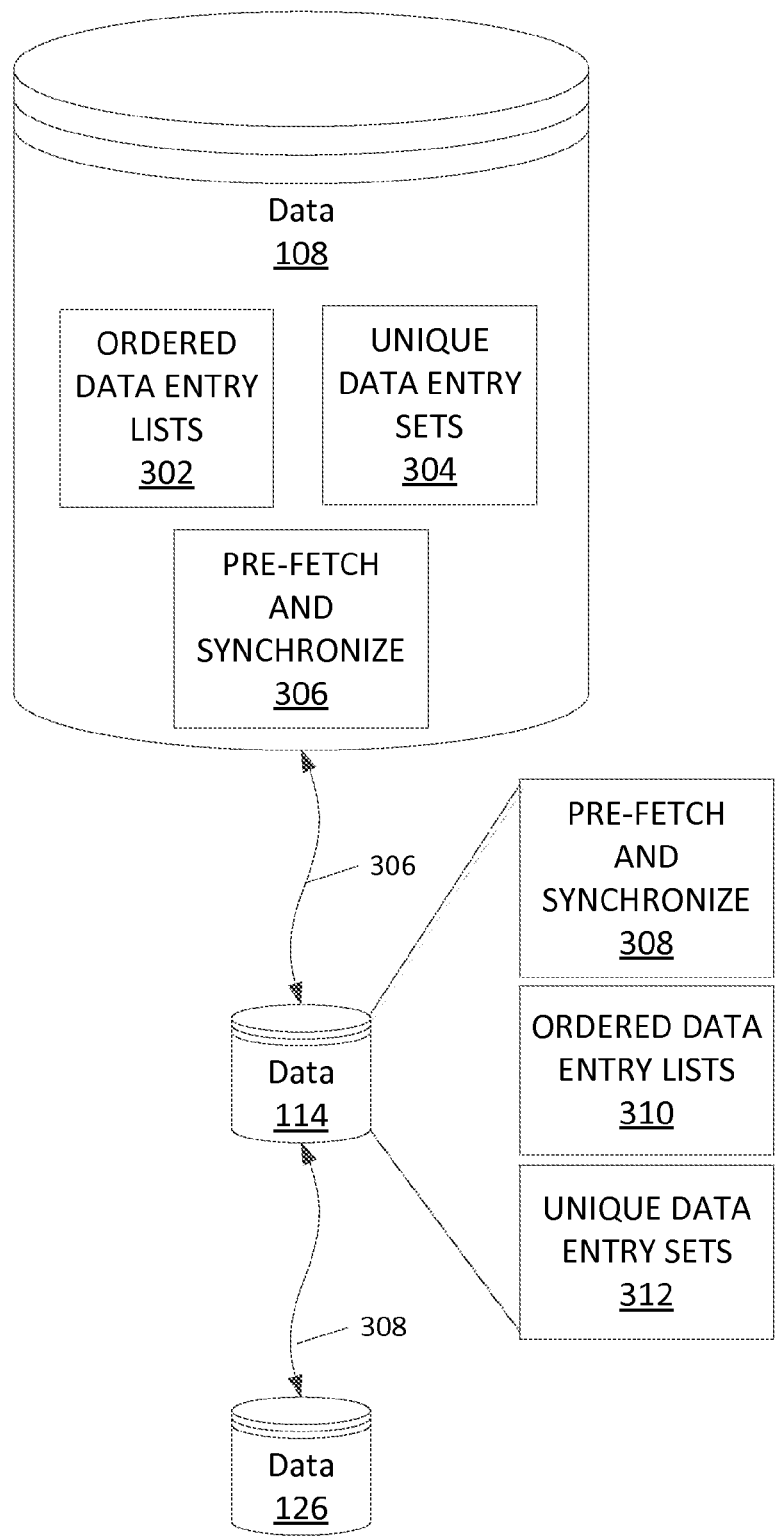
FIG. 3 illustrates data, according to some example embodiments.

FIG. 3 illustrates data 108, according to some example embodiments. Illustrated in FIG. 3 are data 108, ordered data entry lists 302, unique data entry sets 304, data 114, data 126, pre-fetch and synchronize 306, pre-fetch and synchronize 308, ordered data entry lists 310, and unique data entry sets 312.

In an example embodiment, the client agents 106 may use the ordered data entry lists 302 to store data entries in a first-in, first-out fashion, which may keep track of the original order in which the data entries are stored. In an example embodiment, the ordered data entry lists 302 are used by the client agents 106 to store data entries when the communications mode 120 is not in a connected 202 mode. The ordered data entry lists 302 may be used to store mobile application 104 requests. For example, the mobile application 104 may be an activity feed for a field engineer where the activities posted to the activity log should be unique and the order of the activities maintained. In an example embodiment, the client agents 106 send the ordered data entry lists 302 to the appropriate server agents 112 in an appropriate communication mode 120. In an example embodiment, entries with the same identification (ID) may be used more than once in the ordered data entry lists 302. This may permit client agents 106 to track different versions of the data entry such as different versions of the same report. Illustrated in Table 1 are methods that may be used by the client agent to use the ordered data entry lists 302.

TABLE 1

Methods for Ordered Data Entry Lists

| Ordered Entry Lists API | Description |
| --- | --- |
| createEntryList( ) | Creates an entryList, returning its uniqueId |
| deleteEntryList(entryListId) | Delete an entryList with all its content |
| addEntry(entryListId, entryId, content) | Inserts a new entry in the list |
| readFirst(entryListId) | Reads the first entry of the list |
| readLast(entryListId) | Reads the last entry of the list |
| removeFirst(entryListId) | Removes the first entry of the list |
| removeLast(entryListId) | Removes the last entry of the list |
| removeEntry(entryListId, entryId) | Removes a specific entry of the list, returning it back to the requester |
| readEntry(entryListId, entryId) | Returns an entry from an entryList if it exists |
| filterEntries(entryListId, beginTS, endTS) | Returns a sub-list of entries from an entry list that falls between a begin and end timestamp |

The unique data entry sets 304 may be used to store the latest state of a data entry. The unique data entry sets 304 may enable data queries such as, "what data sets have changed within a time frame?" A data entry may be unique based on a data ID. In some example embodiments, only the latest value of a data entry will be stored. For example, in some example embodiments, only the latest weekly timesheet or current progress of a project task will be stored in the unique data entry sets 304. In an example embodiment, the client agents 106 may determine which data entries need to be updated by comparing the ID and timestamps with data entries stored in data 114 or data 126. Illustrated in Table 2 are methods that may be used by the client agent to use the unique data entry sets 304, according to some example embodiments.

TABLE 2

Methods for Unique Data Entry Operations

| Unique Entry Set operations | Description |
| --- | --- |
| createEntrySet( ) | Creates a new entryset returning its unique id. |
| deleteEntrySet(entrySetId) | Delete an existing entry set identified by its id. |
| saveEntry(entrySetId, entryId, content) | Replaces an existing entry within an entry set with a new content. |
| readEntry(entrySetId, entryId) | Returns the content of an existing entry with in an entry set |
| filterEntries(entrySetId, beginTS, endTS) | Returns a sub-set of entries from an entrySet, where entries' timestamps fall within the provided interval. |

Pre-fetch and synchronize 306, and pre-fetch and synchronize 308, indicate that the client agents 106, server agents 112, and/or back-end applications 118 may pre-fetch and synchronize data 108, data 114, and data 126. In an example embodiment, the server agents 112 may be configured to use ordered data entry lists 310 and unique data entry sets 312, and data 114 may be configured to store ordered data entry lists 310 and unique data entry sets 312. In an example embodiment, the server agents 112 may be configured to use ordered data entry lists 310 and unique data entry sets 312, and data 114 may be configured In an example embodiment, the client agents 106 and server agents 112 may use the same methods for ordered data entry lists 302 and unique data entry sets 304, which may have the advantage of reducing the complexity of development of the client agents 106 and server agents 112.

Table 3 illustrates primitives for synchronization and pre-fetching between the client agents 106 and server agents 112 according to some disclosed example embodiments.

TABLE 3

Primitive for Synchronization and Pre-Fetching

| Primitive | Description |
| --- | --- |
| checkEntry(entryId) | Compares the timestamps between entryIds between a client and middleware agent |
| checkEntryIds(entryIdList) | Checks a list of entry ids from the client with the ones in the middleware. |
| checkEntrySet(entrySet) | Checks a set of entries from a client database with the ones in the middleware. The entrySet includes entry content. Returns a list of entries to fetch, push, delete |
| checkEntryList(entryList) | Checks a set of entries from a client database with the ones in the middleware. The entryList includes entry content. Returns a list of entries to fetch, push, delete. |
| checkEntry(entryId, content) | Semantic compare client and middleware entries based on content. |
| fetchEntry(entryId, content) | Reads an entry from the middleware. |
| pushEntry(entryId, content) | Sends an entry (new or update) form the client to the middleware |
| deleteEntry(entryId) | Propagates a deletion from client to middleware |

Figure 4:
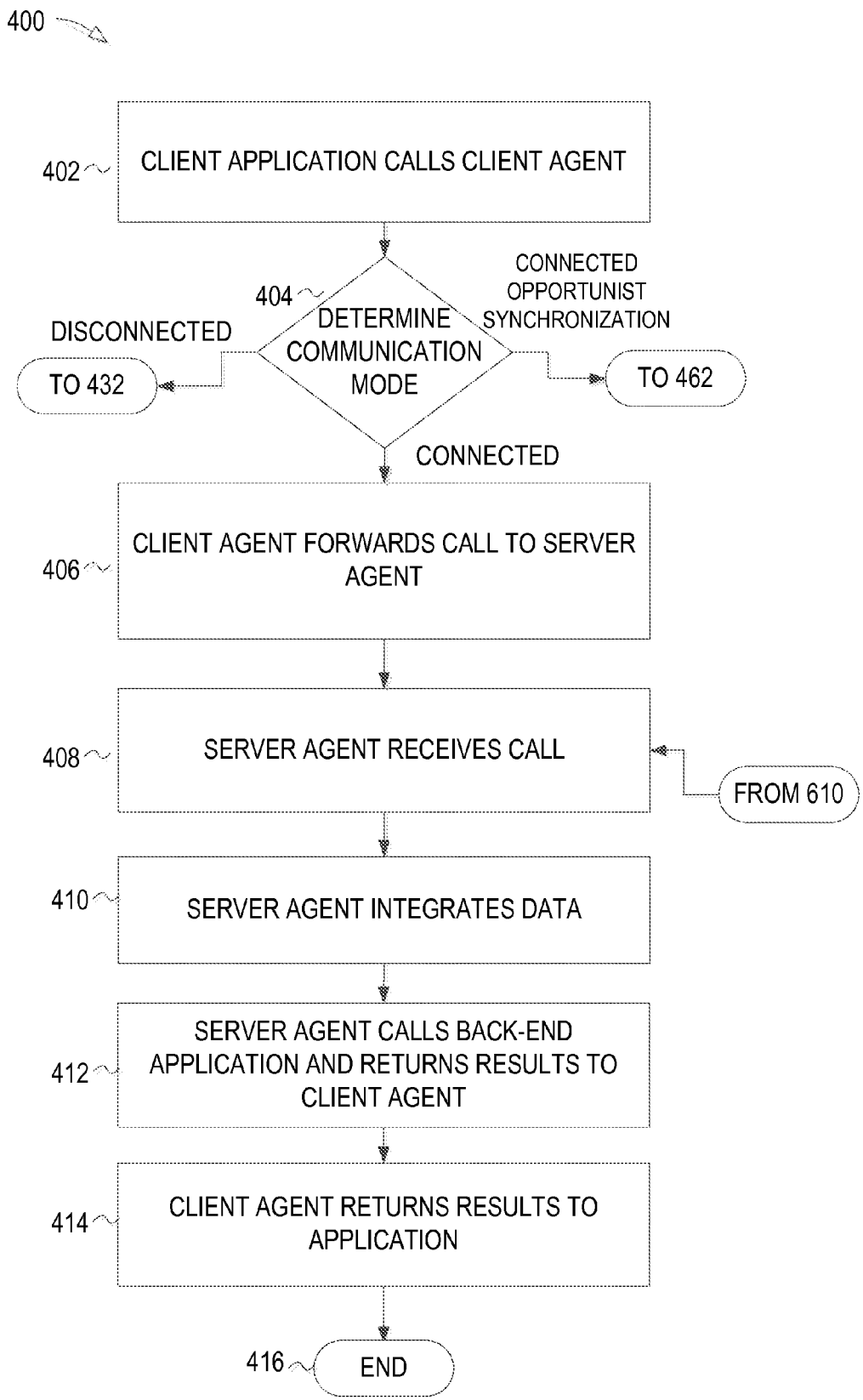
FIGS. 4, 5, and 6 illustrate a method for integrated mobile applications, according to some example embodiments.
Figure 5:
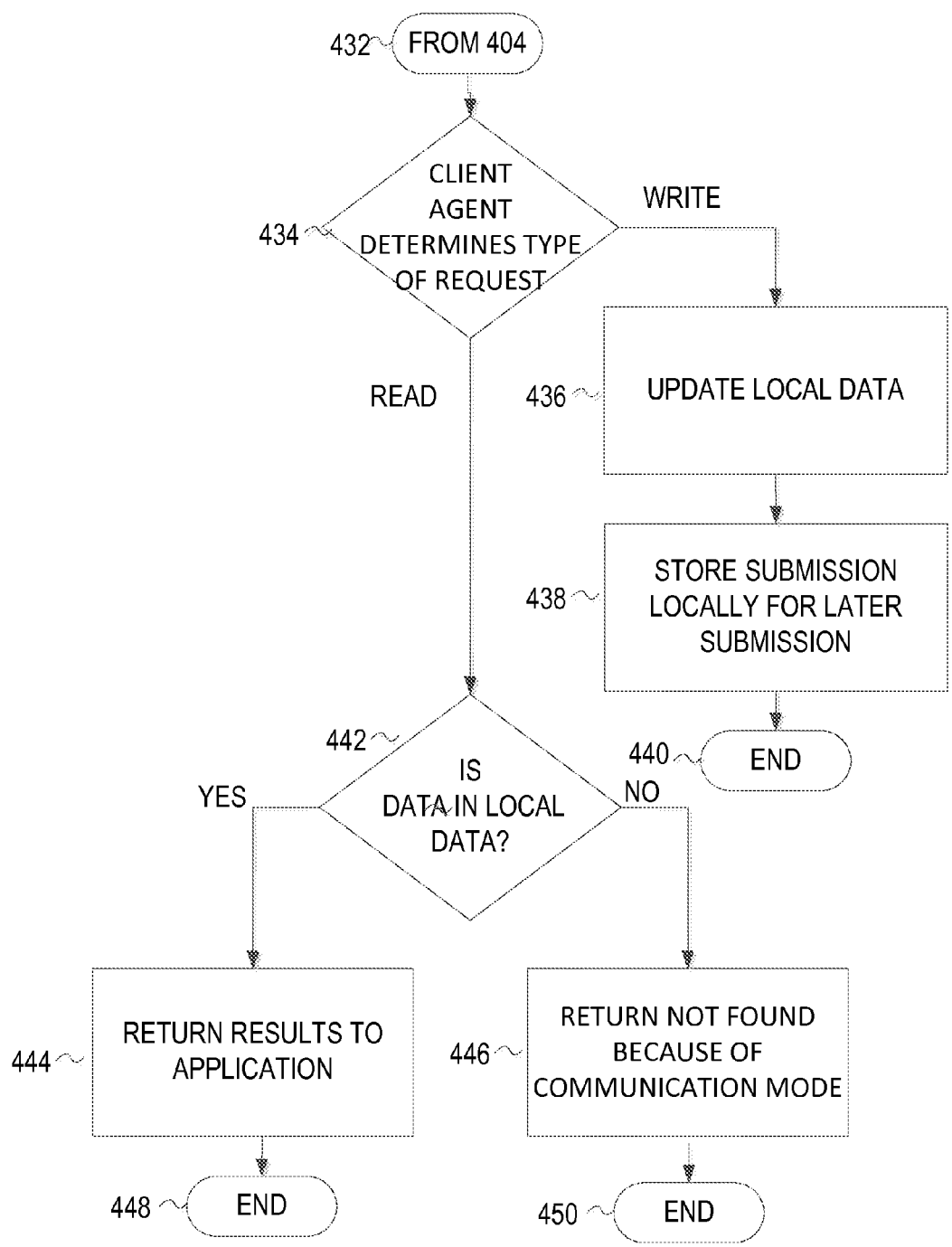
Figure 6:
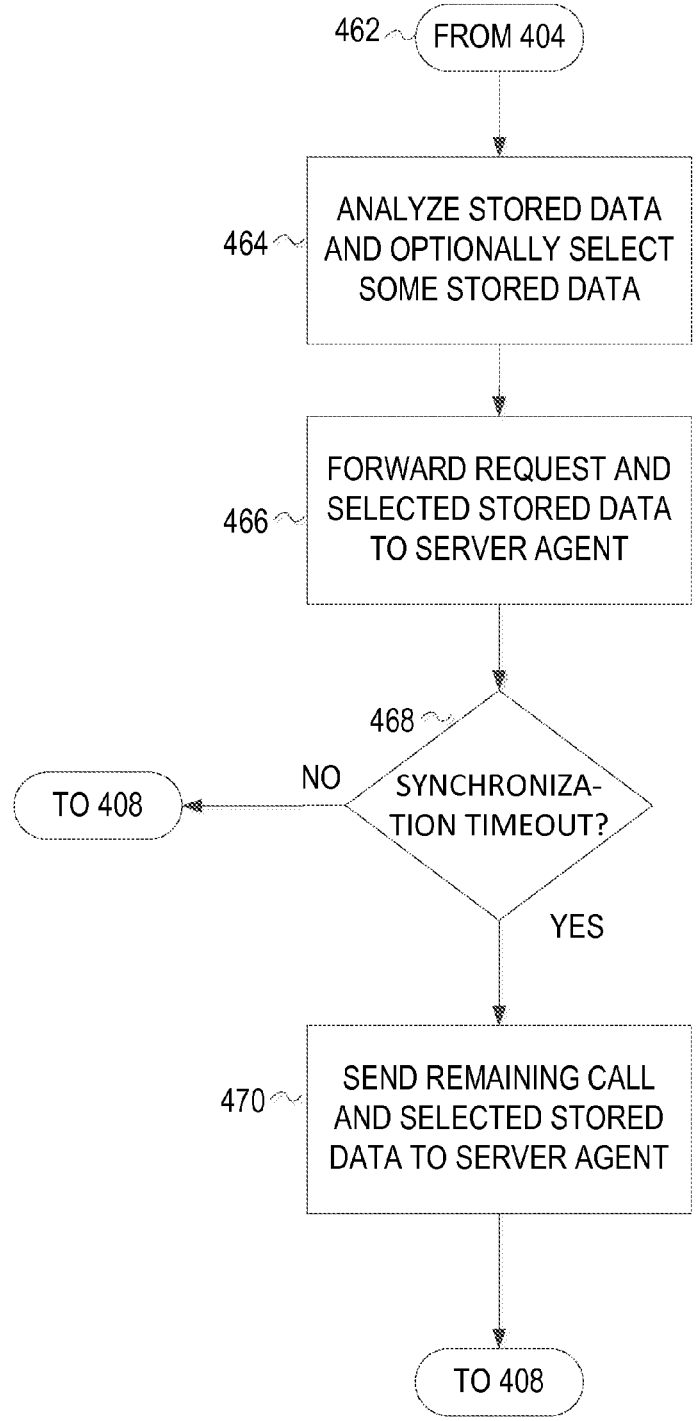

FIGS. 4, 5, and 6 illustrate a method 400 for agent-based architecture for integrated mobile applications, according to some example embodiments. The method 400 may begin with the client application calling the client agent 402. For example, referring to FIG. 1, mobile application 104.1 may call client agent 106.1.

The method 400 may continue with determining a communication mode 404. For example, the system 100 may determine a communication mode 120 as disclosed in FIG. 2. The method 400 may continue to step 532 (FIG. 5) for a disconnected communication mode. The method 400 may continue to step 602 (FIG. 6) for a connected opportunistic synchronization communication mode.

The method 400 may continue for a connected mode with client agent forwarding requests to server agent 406. For example, client agent 106.1 may forward the request to server agent 112.1. The method 400 may continue with the server agent receiving the request 408. For example, the server agent 112.1 may receive the request from the client agent 106.1.

Optionally, the method 400 may continue with the server agent integrating the data 410. For example, server agent 112.1 may integrate and/or filter data from other client agents 106 or other services to prepare the call to the back-end application 118.1.

The method 400 may continue with the server agent calling back-end application and returning results to client agent 412. For example, the server agent 112.1 may call a back-end application 118.1 and then return the results to the client agent 106.1. In some example embodiments, the server agent 112.1 may integrate and/or filter the data returned from the back-end application 118.1 prior to returning the data to the client agent 106.1.

The method 400 may continue with client agent returning results to application 414. For example, the client agent 106.1 may return the results back to the mobile application 104.1. In some example embodiments, the client agent 106.1 may store all or a portion of the results in the data 108. The method 400 may end 416.

Referring now to FIG. 5, the method 400 may continue at 432 with determining the communication mode is disconnected at 404 (FIG. 4). The method 400 may continue with the client agent determining a type of request 434. For example, the client agent 106.1 may determine whether or not the request is a read or write.

The method 400 may continue with updating local data 436 if the client agent determines that the type of request is a write. For example, the client agent 106.1 may update data 108 using a method in Table 1 or Table 2.

The method 400 may continue with storing submission locally for later submission 408. For example, the client agent 106.1 may store the request from the mobile application 104.1 in data 108 using a method in Table 1 or Table 2. The method 400 may end 440. The stored request may then be forwarded to the server agent when the communication mode changes to an appropriate mode.

The method 400 may continue at 434 when the type of request is a read with determining if the data is local 442. For example, the client agent 106 may determine whether or not the read request may be satisfied by data 108.

The method 400 may continue with returning results to application 444 if the data is local data. For example, the client agent 106.1 may determine that a request may be satisfied by data 108. The client agent 106.1 may then perform the request and return the results to the mobile application 104.1. The method 400 may then end 448.

The method 400 may continue with retuning not found because of communication mode 446 if the data is not local. For example, the client agent 106.1 may determine that the request cannot be satisfied with the data in data 108 and that the communication mode is not appropriate to pass the request to the server agent. Based on this determination, the client agent 106.1 may return to the mobile application 104.1 that the request cannot be satisfied. The client agent 106.1 may include information that the request cannot be satisfied due to the communication mode and the data not being available in data 108. The method 400 may end 450.

The method 400 may begin at 462 from determining the communication mode is connected opportunistic synchronization at 404. The method 400 may continue with analyzing stored data and optionally selecting some stored data 464. For example, the client agent 106 may select some data that was stored that may need to be sent to the back-end application, and may eliminate semantically invalid stored data 464. For example, the client agent 106.1 may analyze the data 108 to determine data 108 that is relevant to the request. The client agent 106.1 may, for example, call filterEntry(entrySetId, beginTS, endTS), where beginTS is the last time the client agent 106.1 was not in connected mode. The call to filterEntry will return a list or set of time entries that need to be synchronized. The client agent 106.1 may then eliminate data 108 that is not semantically valid.

The client agent 106.1 may perform a semantic check to determine if data 108 needs to be synchronized with data 114. For example, a user may have updated their timesheet many times using a mobile application 104. The user may have submitted their timesheet to the back-end application 118.1. The timesheet may be approved and closed by the back-end application 118.1. The user may then update the timesheet locally in data 108. A semantic checkEntry( ) may determine that the updates will not be accepted and do not need to be synchronized.

In another example, the client agent 106.1 may determine that multiple changes to a project plan edited by a mobile application 104.1 and stored in data 108 and not synchronized with data 114 and data 126 may be condensed by only sending the last update or a difference between the project plan from the last synchronization to the server agent 112 rather each update.

In this way, the client agent 106.1 may reduce the bandwidth needed to synchronize with the server agent 112.

In example embodiments, the method 400 may have the advantage of conserving bandwidth by sending data 108 to the server agent 112 with requests related to the data 108 and, in some example embodiments, the bandwidth may be used more efficiently by using available bandwidth to send data 108 relevant to the request.

In some example embodiments, the client agent 106 may call checkEntrySet( ) to determine which entries need to be deleted, updated, and created in data 114 from data 108. The method 400 may continue with forwarding the request and selected stored data to server agent 466. For example, the client agent 106 may select some or all of the data related to the request and forward the data and the request to the server agent 112.

The method 400 may continue with determining whether or not there is a synchronization timeout 468. If there is not a synchronization timeout, then the method 400 may continue to 468. If there is a synchronization timeout, then the method 400 may continue sending remaining requests and selected stored data to server agent at 470. For example, the communications mode 120 may become disconnected 204 and a timeout may occur so that not all the selected data and the request were forwarded to the server agent 112. In an example embodiment, the client agent 106 may later send the remaining selected data and requests to the server agent 112. The method 400 may continue to 408.

Figure 7:
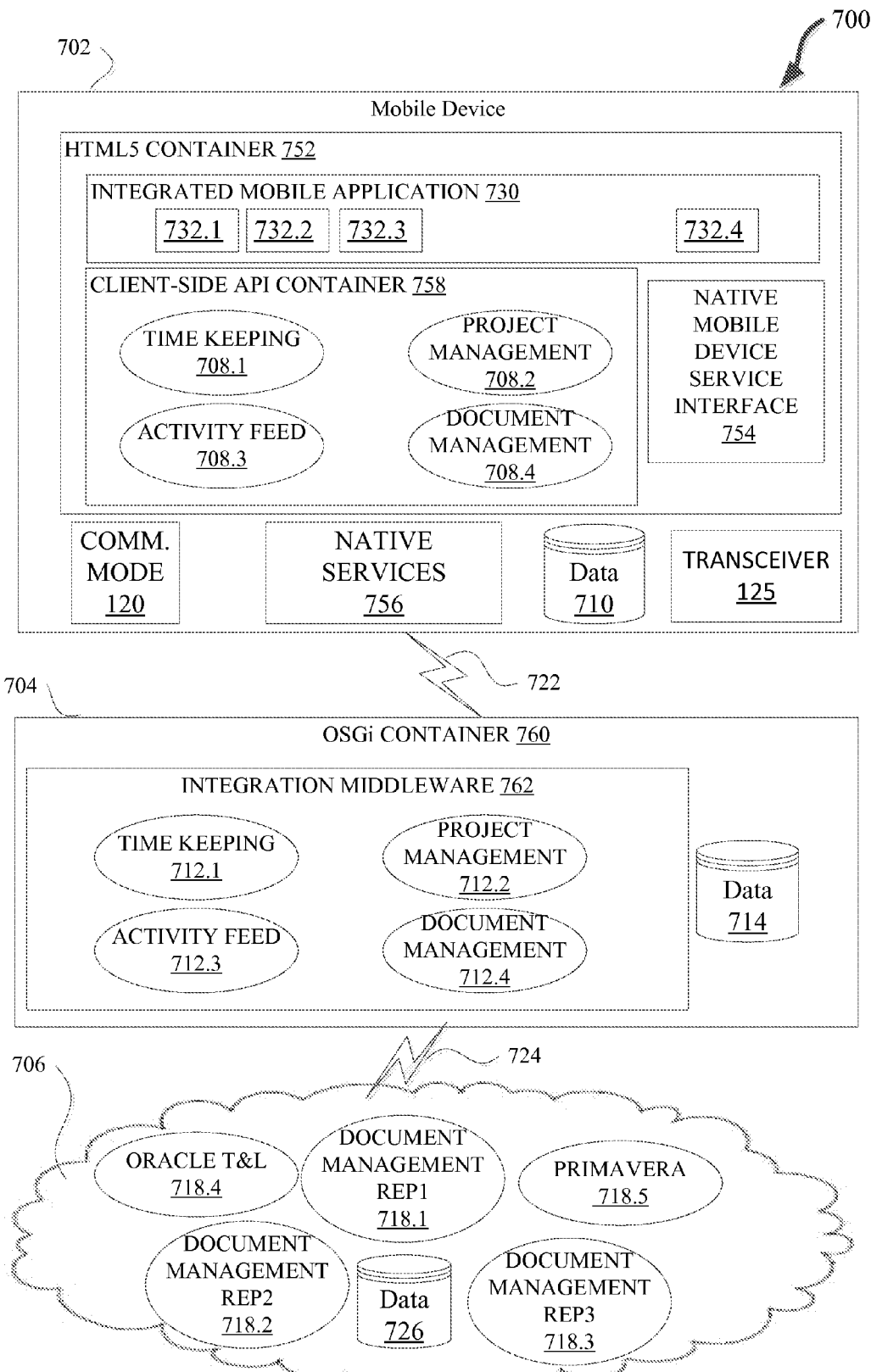
FIG. 7 illustrates a system for integrated mobile applications, according to an example embodiment.

FIG. 7 illustrates a system 700 for agent-based architecture for integrated mobile applications, according to an example embodiment. The system 700 for integrated applications includes mobile device 702, middleware integration layer 704, and corporate application layer 706.

The mobile device 702 includes Hypertext Markup Language 5 (HTML5) container 752, communications mode 120, native services 756, transceiver 125, and data 710. The HTML5 container 752 may include the integrated mobile application 730, client-side API container 758, and native mobile device service interface 754.

The integrated mobile application 730 may be a Smart-Outage™ mobile application for field engineers. The integrated mobile application 730 may include time keeping mobile application 732.1, project management mobile application 732.2, activity feed mobile application 732.3, and document management mobile application 732.4. Time keeping mobile application 732.1 may be an application for a field engineer (not illustrated) to enter time. Project management mobile application 732.2 may be an application for managing a project. Activity feed mobile application 732.3 may be an application for providing an activity feed. Document management mobile application 732.4 may be an application for providing document management. The integrated mobile application 730 may be developed within an HTML5 container 752 such as PhoneGap or Apache Cordova using JavaScript. In some example embodiments, the use of HTML5 and JavaScript provide integrated mobile applications 730 that may be ported to different operating systems (OSs). The mobile applications 732.1, 732.2, 732.3, 732.4 may be mobile applications 104. The integrated mobile application 730 may be a mobile application 104.

The client-side API container 758 may include a timekeeping client agent 708.1, a project management client agent 708.2, an activity feed client agent 708.3, and a document management client agent 708.4. The client agents 708.1, 708.2, 708.3, 708.4 may be client agents 106.

The native mobile device services interface 754 may provide interfaces for the HTML5 container 752 to native mobile device services such as communication services. The native services 756 may provide native services 756 to the HTML5 container 752 such as communication services or data access services.

The data 710 may be data that is stored locally on the mobile device 702 or accessible to the mobile device 702 without using the communication link 722 to the middleware integration layer 704. The data 710 may be data 108.

The middleware integration layer 704 may include Open Service Gateway initiative(OSGi) container 760. The OSGi container 760 may include integration middleware 762 and data 714. The integration middleware 762 may include time keeping server agent 712.1, project management server agent 712.2, activity feed server agent 712.3, and document management server agent 712.4. The server agents 712.1, 712.2, 712.3, 712.4 may be server agents 112.

The time keeping server agent 712.1 may be configured to communicate with Oracle T&L back-end application 718.4. The project management server agent 712.2 may be configured to communicate with Primavera back-end application 718.5 The activity feed server agent 712.3 may be configured to store user provided message feeds as well as application generated feeds such as updates from the project management mobile agent 708.2. The document management server agent 712.4 may be configured to filter, index, and cache documents from different proprietary document management back-end applications document management REP1 718.1, document management REP2 718.2, and document management REP3 718.3.

In some example embodiments, the server agents 112 may be implemented as bundles in an OSGi container such as apache Karaf. The data 714 may be data 114. Communications link 722 may be communication link 122. Communication link 724 may be communication link 124.

In some example embodiments, the corporate application layer 706 may include Oracle T&L back-end application 718.1, Primavera back-end application 718.5, and document management back-end applications REP1 back-end application 718.1, document management REP2 718.2, and document management REP3 718.3. The back-end applications 718 may be back-end applications 118. Data 726 may be data 126.

Figure 8:
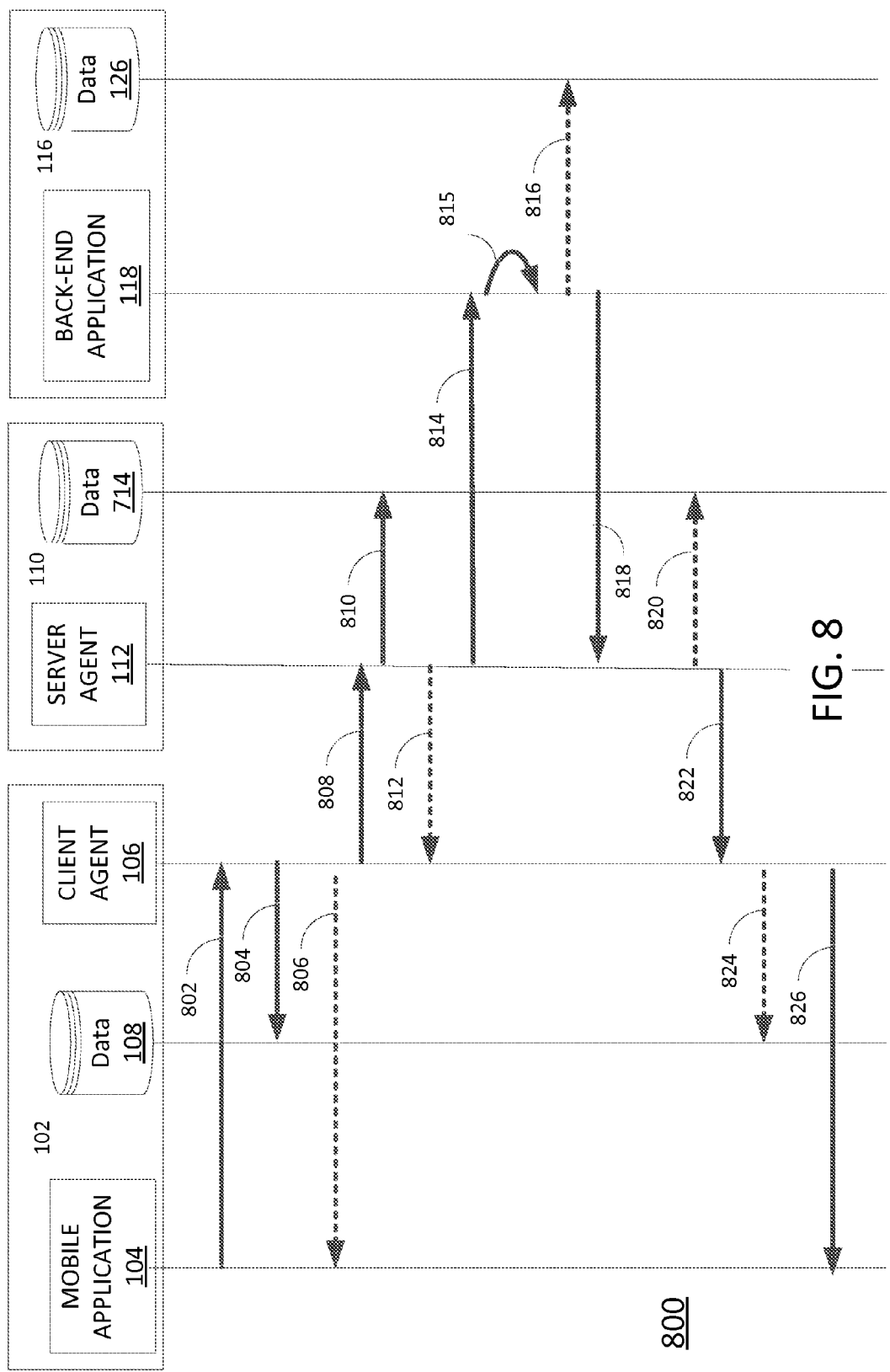
FIG. 8 illustrates a flow diagram for the system of integrated mobile applications, according to some example embodiments.

FIG. 8 illustrates a flow diagram 800 for the system 100 for agent-based architecture for integrated mobile applications. Illustrated in FIG. 8 are mobile device 102, communications network 110, and second communications network 116. The communication mode 120 may be connected 202 or connected opportunistic synchronization 206.

The flow diagram 800 may begin when mobile application 104 requests data from client agent 106 at 802. For example, the integrated mobile application 730 may request data in anticipation of the communication mode 120 not being connected 202. In another example, an activity feed application may request that an activity be stored. In another example, a task management application may request tasks for the day. In another example, a task management application may request that a task be updated with activity.

The flow diagram 800 may optionally continue with the client agent 106 accessing the data 108 at 804. In an example embodiment, the client agent 106 may not access the data 108. For example, the client agent 106 may be aware that the integrated mobile application 730 is requesting data for the day and thus be aware that data 108 will not have the data requested by the integrated mobile application 730. In an example embodiment, the client agent 106 may check data 108 to determine whether or not the request 802 from the mobile application 104 may be satisfied. For example, the client agent 106 may determine that the request is a read request for a document and check data 108 for whether or not the document is stored in data 108. In some example embodiments, the flow diagram 800 may end at 806 with the client agent 106 determining that the request 802 can be satisfied by data 108, and then the client agent 106 satisfying the request 802 with data 108.

In some example embodiments, the client agent 106 may store the request 802 in the data 108. For example, the client agent 106 may store an update to an activity feed, time entry, or task management application. In an example embodiment, if the communications mode 120 is connected opportunistic synchronization 206, then client agent 106 may select data 108 that was previously stored in data 108 and not sent to the back-end application 118 to send to the back-end application 118. In an example embodiment, the client agent 106 may determine that the request 802 is not semantically consistent with data 108 and change the request 802.

The flow diagram 800 may continue with the client agent 106 forwarding the request 802 to the server agent 112 at 808. The server agent 112 may access data 714 at 810. For example, the server agent 112 may store the forwarded request 808 in data 714. For example, the forwarded request 808 may be an activity, and the server agent 112 may store the forwarded request 808 in an activity log in data 714. In an example embodiment, the server agent 112 may determine that the forwarded request 808 may be satisfied by data 714. For example, the request may be a request for a document that is stored in 714. The server agent 112 may satisfy the request at 812.

The flow diagram 800 may continue with calling the back-end application 118 to satisfy the forwarded request 808 at 814. For example, in an example embodiment, the server agent 112 may forward a request for a document to the back-end application 118. In an example embodiment, the server agent 112 may determine which back-end application 118 to send the forwarded request 808. In an example embodiment, the server agent 112 may modify the forwarded request 808 before forwarding the forwarded request 808 to the back-end application 118. For example, the server agent 112 may determine that a request to update a time entry needs to be translated into a different format for the back-end application 118. In an example embodiment, the server agent 112 may call more than one back-end application 118 to satisfy the forwarded request 808.

The flow diagram 800 may continue with the back end application 118 satisfying the forwarded request 814 at 815. For example, the back-end application 118 may change the progress of a task in a task management application, or the back-end application 118 may retrieve portions of a document. The back-end application 118 may access data 126 to satisfy the forwarded request 814 at 816.

The flow diagram 800 continues with the back-end application 118 returning a result to the sever agent 112 at 818. For example, the back-end application 118 may return an updated task schedule, portion of a document, or an indication that a time entry has been updated and that a time sheet for the day has been closed.

The flow diagram 800 may optionally continue with the server agent 112 storing part of the returned result 818 in the data 714 at 820. For example, the server agent 112 may maintain a current state of the time management program or cache of documents. The server agent 112 may determine how to integrate the returned result 818 with data 714.

The flow diagram 800 may continue with the server agent 112 returning a result to the client agent 106 at 822. The client agent 106 may optionally store the result 822 in data 108 at 824. The client agent 106 may determine how to integrate the result 822 with the data 108.

The flow diagram 800 may continue with the client agent 106 satisfying the request 802 at 826. For example, the client agent 106 may satisfy the request with documents, data from a time management application, data from a task management application, or other data. The flow diagram 800 may end.

Figure 9:
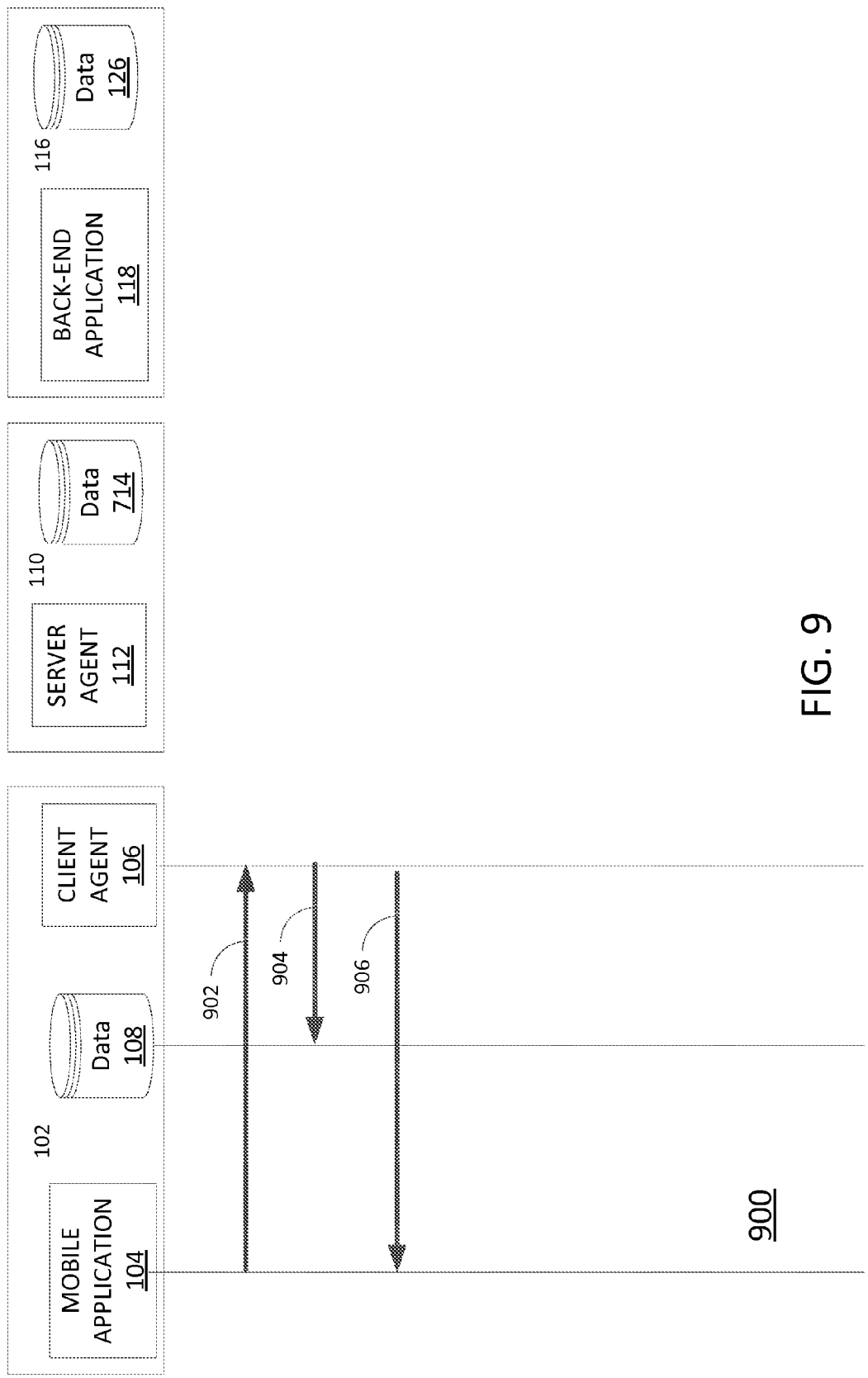
FIG. 9 illustrates a flow diagram for the system of integrated mobile applications, according to some example embodiments.

FIG. 9 illustrates a flow diagram 900 for the system 100 for agent-based architecture for integrated mobile applications, according to some example embodiments. Illustrated in FIG. 9 are mobile device 102, communications network 110, and second communications network 116. The communication mode 120 may be disconnected 204.

The flow diagram 900 may begin with mobile application 104 requesting data from client agent 106 at 902. For example, the integrated mobile application 730 may request data in anticipation of the communication mode 120 not being connected 202. In another example, an activity feed application may request that an activity be stored. In another example, a task management application may request tasks for the day. In another example, a task management application may request that a task be updated with activity.

The flow diagram 900 may continue with the client agent 106 accessing the data 108. The client agent 106 determines that the communication mode 120 is disconnected 204.

The flow diagram 900 may continue with the client agent 106 accessing data 108 at 904. In an example embodiment, the client agent 106 may check data 108 to determine whether or not the request 902 from the mobile application 104 may be satisfied. For example, the client agent 106 may determine that the request is a read request for a document and check data 108 for whether or not the document is stored in data 108. In some example embodiments, the flow diagram 900 may end with the client agent 106 determining that the request 902 can be satisfied by data 108, and then the client agent 106 satisfying the request 902 with data 108 at 906.

In some example embodiments, the client agent 106 may store the request 902 in the data 108. For example, the client agent 106 may store an update to an activity feed, time entry, or task management application. In some example embodiments, the client agent 106 may determine that the request 902 cannot be satisfied and then the client agent 106 sends an indication to the mobile application 104 that the request 902 cannot be satisfied.

Figure 10:
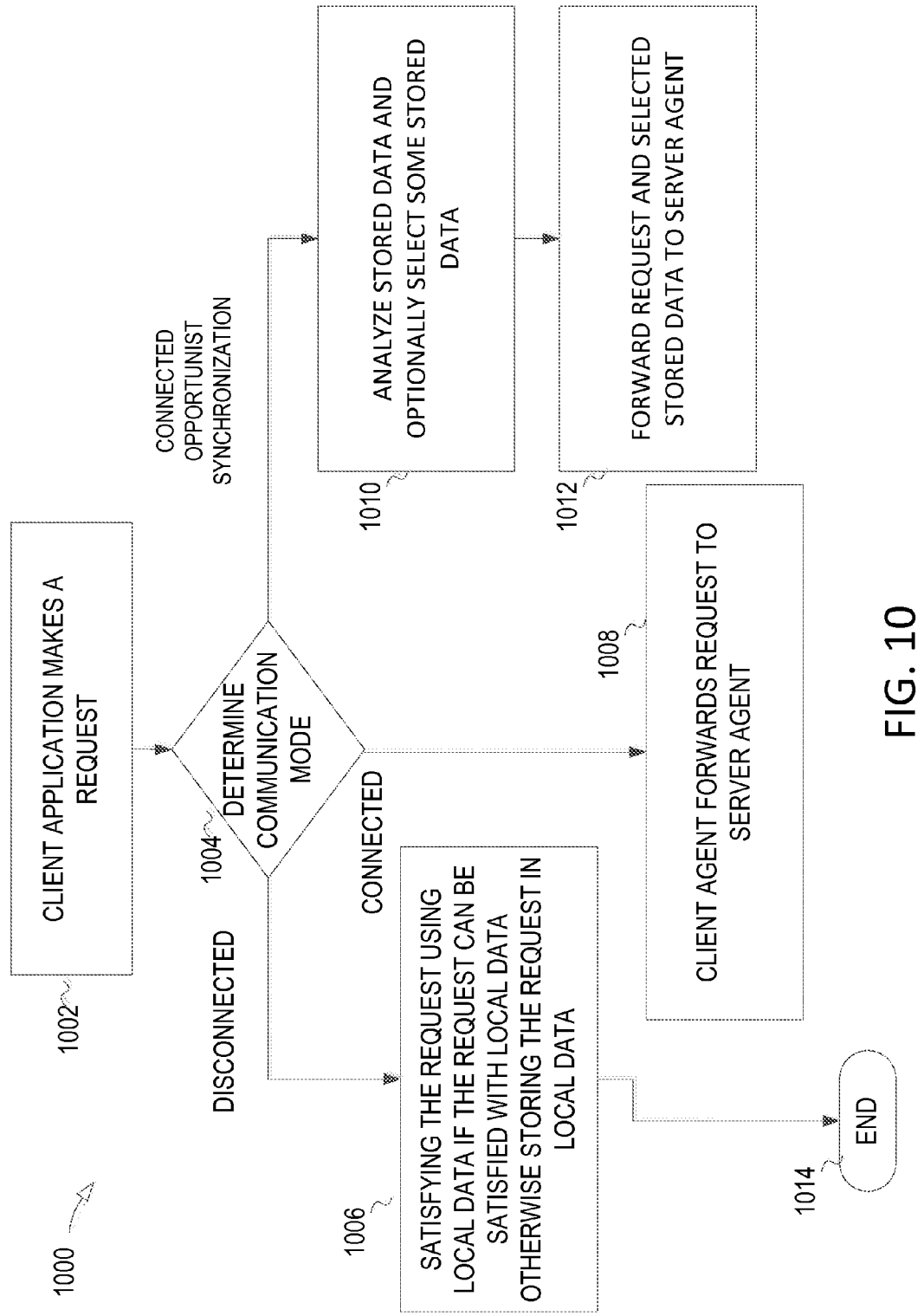
FIG. 10 illustrates a method for integrated mobile applications, according to some example embodiments.

FIG. 10 illustrates a method 1000 for agent-based architecture for integrated mobile applications, according to some example embodiments. The method 1000 may begin with the client application calling the client agent with a request at 1002. For example, referring to FIG. 1, mobile application 104.1 may call client agent 106.1.

The method 1000 may continue with determining a communication mode 1004. For example, the system 100 may determine a communication mode 120 as disclosed in FIG. 2.

For a disconnected communication mode, the method 1000 may continue with satisfying the request using local data if the request can be satisfied with local data; otherwise, the request is stored in local data 1006. For example, as disclosed in FIG. 5 and the accompanying text, the client agent 106 may satisfy the request if the request can be satisfied with data 114. The method 1000 may then end 1014.

For a connected communications mode, the method 1000 may continue with the client agent forwarding the request to a server agent 1008. For example, client agent 106.1 may forward the request to server agent 112.1.

For a connected opportunist synchronization, the method 1000 may continue with analyzing stored data and optionally selecting some stored data 1010. The method 1000 may continue with forwarding the request and selected stored data to the server agent 1012. For example, the client agent 106 may forward the request and selected stored data to the server agent 112.

In example embodiments, the system 100 (see FIG. 1) for integrated mobile applications may have the technical effect of better utilizing the communication link 122 and/or communication link 124 by selecting data from the local data associated with an application and sending the selected data and the request to the server agent.

In example embodiments, the system 100 may have the technical effect of better utilizing the communication link 122 and/or communication link 124 by using RESTful Web services for both the client agents 106 and the server agents 112, at least because the RESTful Web services may enable one communication link 122 and/or communication link 124 to be used to transfer data and make requests without both communication links 122, 124 being in a connected mode.

The system 100 may provide the advantage that the application program interface for mobile applications 104 may be less complicated because the server agents 112 may provide a transparent interface to back-end applications 118.

The system 100 may provide the advantage of transparent pre-caching of data to data 108 based on anticipated mobile application 104.

The system 100 may provide the advantage that the client agent 106 may not need to be changed to accommodate a change of back-end application 118 because it may be sufficient to modify the server agent 112.

Figure 11:
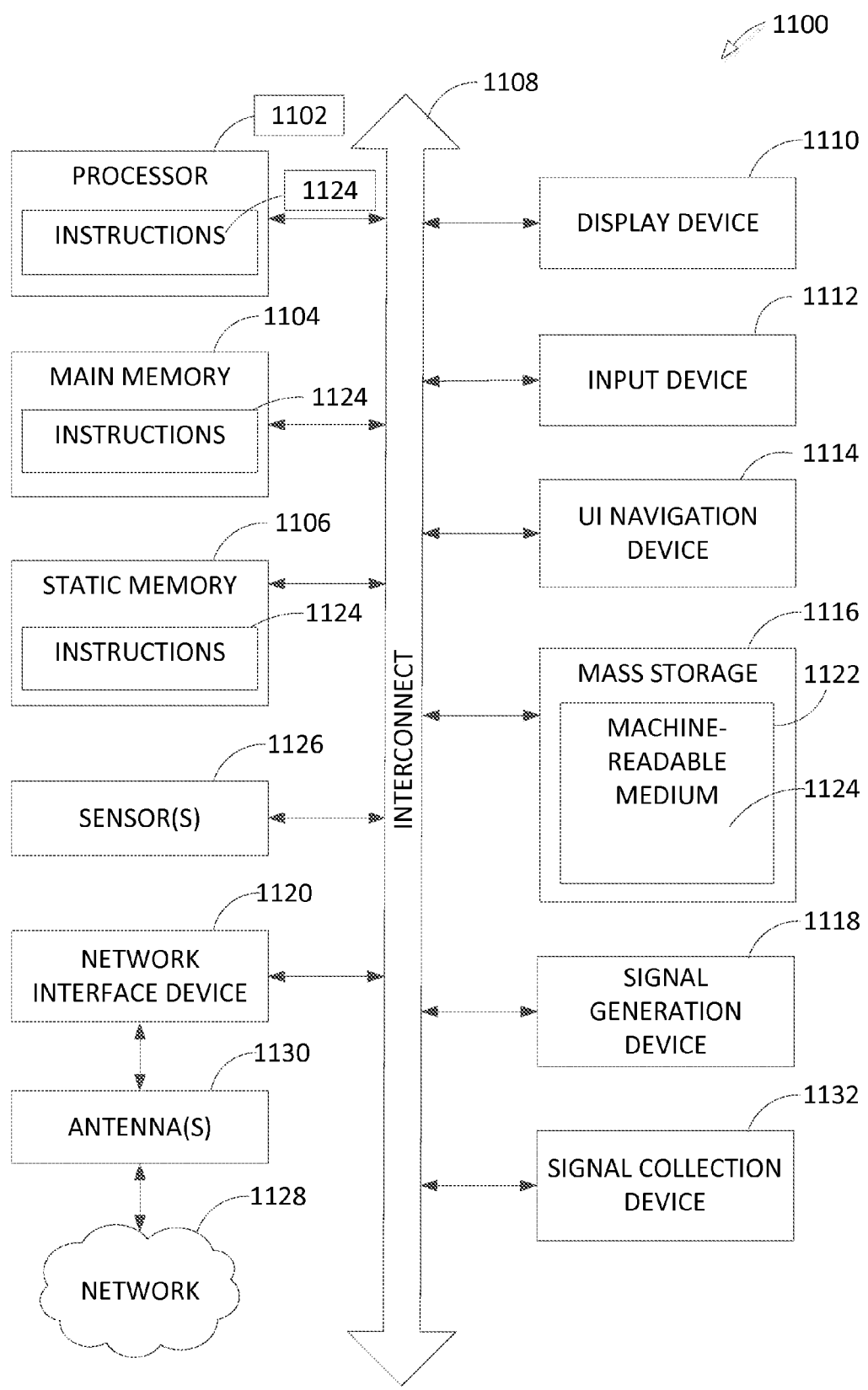
FIG. 11 is a diagrammatic representation of a machine in the example form of a computer system within which a set of instructions for causing the machine to perform any one or more of the methodologies discussed herein may be executed.

FIG. 11 is a block diagram of a machine or apparatus in the example form of a computer system 1100 within which instructions, for causing the machine or apparatus to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a wearable device, a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104 and a static memory 1106, which communicate with each other via a bus 1108. The computer system 1100 may further include a display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), mass storage 1116, a signal generation device 1118 (e.g., a speaker), and a network interface device 1120.

The mass storage 1116 includes a machine-readable medium 1122 on which is stored one or more sets of instructions and data structures (e.g., software) 1124 embodying or used by any one or more of the methodologies or functions described herein. For example, the instructions 1124 may include data 108, mobile applications 104, client agent 106, server agent 112, data 114, back-end application 118, data 126, and/or an implementation of any of the method steps described herein.

The instructions 1124 may also reside, completely or at least partially, within the main memory 1104, static memory 1106, and/or within the processor 1102 during execution thereof by the computer system 1100, with the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and compact disk read only memory (CD-ROM) and digital video disc-read only memory (DVD-ROM) disks.

The instructions 1124 may further be transmitted or received over a communications network 1128 using a transmission medium. The instructions 1124 may be transmitted using the network interface device 1120 and any one of a number of well-known transfer protocols (e.g., hypertext mark-up protocol (HTTP)). Examples of communication networks include a local area network (LAN), a wide-area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

FIG. 12 is a block diagram illustrating the mobile device 102, according to an example embodiment. The mobile device 102 may include a processor 1210. The processor 1210 may be any of a variety of different types of commercially available processors suitable for mobile devices (for example, an XScale architecture microprocessor, a Microprocessor without Interlocked Pipeline Stages (MIPS) architecture processor, or another type of processor). The processor 1210 may include applications 1240. The applications 1240 may be partially or wholly hardwired as part of the processor 1210. A memory 1290, such as a Random Access Memory (RAM), a Flash memory, or other type of memory, is typically accessible to the processor. In an example embodiment, the memory 1220 may partially be ROM. The memory 1220 may be adapted to store an OS 1230, data 1290, as well as applications 1240, such as a client agents 106, mobile applications 104, and mobile location enabled application that may provide location based services to a user. The data 1290 may include data such as data 108 and communications mode 120. The processor 1210 may be coupled, either directly or via appropriate intermediary hardware, to a display 1250 and to one or more input/output (I/O) devices 1260, such as a keypad, a touch panel sensor, a microphone, and the like. Similarly, in some example embodiments, the processor 1210 may be coupled to a transceiver 125 that interfaces with an antenna 1275. The transceiver 125 may be configured to both transmit and receive cellular network signals, wireless data signals, or other types of signals via the antenna 1275, depending on the nature of the mobile device 102. In this manner, the communication link 122 with the communications network 110 may be established. Further, in some configurations, a global positioning system (GPS) receiver 1280 may also make use of the antenna 1275 to receive GPS signals. Each of display 1250, transceiver 125, GPS receiver 1280, processor 1210, memory 1290, I/O devices, and antenna 1275 may be connected to an interconnect 1295 and/or connected (not illustrated) to one or more of each other. The interconnect 1295 may be one or more communications systems such as a bus or other hardware to enable communication.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

Certain example embodiments are described herein as including logic or a number of components, modules, applications, agents, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering example embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other example embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

This written description uses examples to disclose some example embodiments, including the best mode, and also to enable any person skilled in the art to practice the invention, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mobile device including a client agent module, the mobile device comprising:
    a transceiver configured to provide communications between a client agent module of the mobile device and a server agent via a communications network; and
    the client agent module implemented by one or more processors, the client agent module configured to receive a request from an integrated mobile application, and the client agent module configured to change a communication mode for handling the request, the communication mode selected from at least a connected mode, a disconnected mode, and an opportunistic synchronization mode in which more connectivity is available than in the disconnected mode and less connectivity is available than in the connected mode, the determining of the communication mode based on a bandwidth of communication link between the client agent and the server agent; wherein in the disconnected mode, the client agent module is configured to satisfy the request using local data, if the request can be satisfied with local data, otherwise the client agent module is configured to store the request in local data, in the connected mode, the client agent module is configured to forward the request to the server agent, and in the opportunistic synchronization mode, the client agent module is configured to select data from the local data associated with the request and send the selected data and the request to the server agent, the selecting including eliminating semantically invalid data from the local data.

2. The mobile device of claim 1, wherein the communication mode may be determined based further on a connectivity of the communications link.

3. The mobile device of claim 1, wherein the client agent module is further configured to select a most recent request from a plurality of requests associated with the integrated mobile application.

4. The mobile device of claim 1, wherein selecting data from the local data associated with the request further comprises:
    eliminating data from the local data based on messages from a back-end application.

5. The mobile device of claim 1, wherein the client agent module is further configured to pre-populate the local data to satisfy requests from the integrated mobile application.

6. The mobile device of claim 1, wherein the service agent forwards the request to at least two back-end applications.

7. The mobile device of claim 1, wherein the service agent satisfies the request using server side data, based on determining that the request can be satisfied by using the server agent data;
    otherwise the server agent forwards the request to a back-end application.

8. The mobile device of claim 1, wherein the server agent stores the request in server agent data and forwards the request to a back-end application; and
    wherein the server agent generates a report based on stored requests in the server agent data.

9. The mobile device of claim 1, wherein the one or more processors are further configured to select the client agent module corresponding to the integrated mobile application.

10. The method of claim 1, wherein the eliminating of the semantically invalid data from the local data includes analyzing the local data to determine a subset of the local data that is relevant to the request.

11. The method of claim 10, wherein the analyzing includes determining a set of time entries that are to be synchronized based on a last time the client agent was not in the connected mode.

12. A method for a client agent on a mobile device, the method comprising:
receiving a request from an integrated mobile application;
changing a communication mode for handling the request, the communication mode selected from at least a connected mode; a disconnected mode, and an opportunistic synchronization mode in which more connectivity is available than in the disconnected mode and less connectivity is available than in the connected mode, the determining of the communication mode based on a bandwidth of communication link between the client agent and the server agent;
in the disconnected mode, satisfying the request using local data, if the request can be satisfied with local data, otherwise storing the request in local data;
in the connected mode, forwarding the request to a server agent; and
in the opportunistic synchronization mode, selecting data from the local data associated with the request and sending the selected data and the request to the server agent, the selecting including eliminating semantically invalid data from the local data.

13. The method of claim 12, wherein the determining the communication mode further comprises determining the communication mode based on at least connectivity of communications the client agent and the server agent.

14. The method of claim 12, wherein selecting data from the local data associated with the request further comprises:
selecting a most recent request from a plurality of requests associated with the application.

15. The method of claim 12, wherein selecting data from the local data associated with the request further comprises:
eliminating data from the local data based on messages from a back-end application.

16. The method of claim 12, further comprising:
pre-populating the local data to satisfy requests from the mobile application.

17. The method of claim 12, wherein the service agent forwards the request to at least two back-end applications.

18. The method of claim 12, wherein the service agent satisfies the request using server side data, if the request can be satisfied by using the server agent data;
otherwise the server agent forwards the request to a back-end application.

19. The method of claim 12, wherein the server agent stores the request in server agent data and forwards the request to the back-end application; and
wherein the server agent generates a report based on stored requests in the server agent data.

20. The method of claim 12, further comprising:
selecting a mobile agent corresponding to the integrated mobile application.

21. A non-transitory computer-readable storage medium that stores instructions for execution by one or more processors to perform operations comprising:
receiving a request from an integrated mobile application;
changing a communication mode for handling the request, the communication mode selected from at least a connected mode, a disconnected mode, and an opportunistic synchronization mode in which more connectivity is available than in the disconnected mode and less connectivity is available than in the connected mode, the determining of the communication mode based on a bandwidth of communication link between the client agent and the server agent;
in the disconnected mode, satisfying the request using local data, if the request can be satisfied with local data, otherwise storing the request in local data;
in the connected mode, forwarding the request to a server agent; and
in the opportunistic synchronization mode, selecting data from the local data associated with the request and sending the selected data and the request to the server agent, the selecting including eliminating semantically invalid data from the local data.

22. A mobile device including an integrated mobile application, the mobile device comprising:
means for configuring a transceiver to provide communications between a client agent of the mobile device and a server agent via a communications network; and
means for configuring a client agent to receive a request from the integrated mobile application, change a communication mode for handling the request, the communication mode selected from at least a connected mode, a disconnected mode, and an opportunistic synchronization mode in which more connectivity is available than in the disconnected mode and less connectivity is available than in the connected mode, the determining of the communication mode based on a bandwidth of communication link between the client agent and the server agent; wherein in the disconnected mode, the client agent is configured to satisfy the request using local data; if the request can be satisfied with local data, otherwise the client module is configured to store the request in local data;
in the connected mode, the client agent is configured to forward the request to the server agent; and
in the opportunistic synchronization mode, the client agent is configured to select data from the local data associated with the request and send the selected data and the request to the server agent, the selecting including eliminating semantically invalid data from the local data.

* * * * *

UNITED STATES PATENT AND TRADEMARK OFFICE
CERTIFICATE OF CORRECTION

PATENT NO. : 9,749,426 B2  
APPLICATION NO. : 14/447370  
DATED : August 29, 2017  
INVENTOR(S) : Silva Filho et al.

Page 1 of 1

It is certified that error appears in the above-identified patent and that said Letters Patent is hereby corrected as shown below:

In Column 18, Line 27, in Claim 1, after "agent;", insert --¶--

In Column 19, Line 4, in Claim 10, delete "method" and insert --mobile device-- therefor In Column 19, Line 8, in Claim 11, delete "method" and insert --mobile device-- therefor In Column 19, Line 17, in Claim 12, delete "mode;" and insert --mode,-- therefor In Column 19, Line 35, in Claim 13, after "comprises", insert --¶--

In Column 20, Line 46, in Claim 22, after "agent;", insert --¶--

In Column 20, Line 48, in Claim 22, delete "data;" and insert --data,-- therefor Signed and Sealed this  
Tenth Day of April, 2018

Andrei Iancu  
*Director of the United States Patent and Trademark Office*